US008838047B2

(12) United States Patent
Rofougaran et al.

(10) Patent No.: US 8,838,047 B2
(45) Date of Patent: Sep. 16, 2014

(54) DYNAMIC RF FRONT END

(75) Inventors: Ahmadreza (Reza) Rofougaran, Newport Coast, CA (US); Maryam Rofougaran, Rancho Palos Verdes, CA (US); Amin Shameli, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1515 days.

(21) Appl. No.: 12/048,748

(22) Filed: Mar. 14, 2008

(65) Prior Publication Data

US 2008/0238688 A1    Oct. 2, 2008

Related U.S. Application Data

(60) Provisional application No. 60/921,221, filed on Mar. 30, 2007, provisional application No. 60/932,411, filed on May 31, 2007.

(51) Int. Cl.
*H04B 1/38* (2006.01)
*H04B 5/00* (2006.01)

(52) U.S. Cl.
CPC ............ *H04B 5/0012* (2013.01); *H04B 5/0062* (2013.01); *H04B 5/0087* (2013.01)
USPC ......... 455/90.2; 455/60; 455/67.16; 455/139; 455/276.1; 455/304

(58) Field of Classification Search
CPC ... H04B 5/0012; H04B 5/0062; H04B 5/0087
See application file for complete search history.

(56) References Cited

U.S. PATENT DOCUMENTS

| | | | | |
|---|---|---|---|---|
| 3,956,699 A * | 5/1976 | Leahy | ........................... | 370/203 |
| 5,333,001 A * | 7/1994 | Profera, Jr. | .................... | 342/373 |
| 5,619,210 A * | 4/1997 | Dent | ............................ | 342/352 |
| 5,724,666 A * | 3/1998 | Dent | ......................... | 455/562.1 |
| 5,832,389 A * | 11/1998 | Dent | ......................... | 455/562.1 |
| 5,995,062 A * | 11/1999 | Denney et al. | ................ | 343/853 |
| 6,104,935 A * | 8/2000 | Smith et al. | ................ | 455/562.1 |
| 6,201,801 B1 * | 3/2001 | Dent | ............................ | 370/342 |
| 6,992,621 B2 * | 1/2006 | Casas et al. | .................... | 342/373 |
| 7,016,654 B1 * | 3/2006 | Bugeja | ............................ | 455/73 |
| 7,149,246 B1 * | 12/2006 | Adams et al. | ................ | 375/238 |
| 7,230,570 B2 * | 6/2007 | Thomas et al. | ............... | 342/372 |
| 7,450,628 B2 * | 11/2008 | Feher | ........................... | 375/146 |
| 2003/0162566 A1 * | 8/2003 | Shapira et al. | ............... | 455/561 |
| 2005/0007286 A1 * | 1/2005 | Trott et al. | .................... | 343/770 |
| 2005/0075139 A1 * | 4/2005 | Shapira | ...................... | 455/562.1 |
| 2005/0227660 A1 * | 10/2005 | Hashemi et al. | ........... | 455/276.1 |
| 2007/0037528 A1 * | 2/2007 | Doan et al. | .................... | 455/101 |
| 2007/0037529 A1 * | 2/2007 | Nagai et al. | .................... | 455/101 |
| 2007/0080787 A1 * | 4/2007 | Taki et al. | .................... | 340/10.1 |

(Continued)

*Primary Examiner* — Zhiyu Lu
(74) *Attorney, Agent, or Firm* — Garlick & Markison; Bruce E. Garlick

(57) ABSTRACT

A dynamic radio frequency (RF) front end includes an antenna array, a power amplifier structure, and a low noise amplifier structure. The power amplifier structure generates a plurality of outbound RF signals from an outbound RF signal and provides the plurality of outbound RF signals to the antenna array. Each of the plurality of outbound RF signals has a different transmit phase rotation. The low noise amplifier structure receives a plurality of inbound RF signals from the antenna array and outputs one of the plurality of inbound RF signals based on a favorable phase relationship with respect to the outbound RF signal. Each of the plurality of inbound RF signals has a different receive phase rotation.

20 Claims, 8 Drawing Sheets

(56) References Cited

U.S. PATENT DOCUMENTS

| | | | |
|---|---|---|---|
| 2007/0191062 A1* | 8/2007 | Kim et al. | 455/561 |
| 2007/0206704 A1* | 9/2007 | Zhou et al. | 375/316 |
| 2007/0218853 A1* | 9/2007 | Yu | 455/272 |
| 2007/0222608 A1* | 9/2007 | Maniwa | 340/572.7 |
| 2007/0285314 A1* | 12/2007 | Mortazawi et al. | 342/375 |
| 2008/0037662 A1* | 2/2008 | Ravi et al. | 375/260 |
| 2009/0028074 A1* | 1/2009 | Knox | 370/278 |

* cited by examiner

DYNAMIC RF FRONT END

This patent application is claiming priority under 35 USC §119 to a provisionally filed patent application entitled RFID SYSTEM, having a provisional filing date of Mar. 30, 2007, and a provisional Ser. No. 60/921,221; and to a provisionally filed patent application entitled RFID SYSTEM, having a provisional filing date of May 31, 2007, and a provisional Ser. No. 60/932,411.

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to communication systems and more particularly to RFID systems.

2. Description of Related Art

A radio frequency identification (RFID) system generally includes a reader, also known as an interrogator, and a remote tag, also known as a transponder. Each tag stores identification data for use in identifying a person, article, parcel or other object. RFID systems may use active tags that include an internal power source, such as a battery, and/or passive tags that do not contain an internal power source, but instead are remotely powered by the reader.

Communication between the reader and the remote tag is enabled by radio frequency (RF) signals. In general, to access the identification data stored on an RFID tag, the RFID reader generates a modulated RF interrogation signal designed to evoke a modulated RF response from a tag. The RF response from the tag includes the coded identification data stored in the RFID tag. The RFID reader decodes the coded identification data to identify the person, article, parcel or other object associated with the RFID tag. For passive tags, the RFID reader also generates an unmodulated, continuous wave (CW) signal to activate and power the tag during data transfer.

RFID systems typically employ either far-field technology, in which the distance between the reader and the tag is great compared to the wavelength of the carrier signal, or near-field technology, in which the operating distance is less than one wavelength of the carrier signal, to facilitate communication between the RFID reader and RFID tag. In far-field applications, the RFID reader generates and transmits an RF signal via an antenna to all tags within range of the antenna. One or more of the tags that receive the RF signal responds to the reader using a backscattering technique in which the tags modulate and reflect the received RF signal. In near-field applications, the RFID reader and tag communicate via mutual inductance between corresponding reader and tag inductors.

Currently, RFID readers are formed of separate and discrete components whose interfaces are well-defined. For example, an RFID reader may consist of a controller or microprocessor implemented on a CMOS integrated circuit and a radio implemented on one or more separate CMOS, BiCMOS or GaAs integrated circuits that are uniquely designed for optimal signal processing in a particular technology (e.g., near-field or far-field). However, the high cost of such discrete-component RFID readers has been a deterrent to widespread deployment of RFID systems. In addition, there are a number of different RFID standards, each defining a different protocol for enabling communication between the reader and the tag. Discrete RFID reader designs inhibit multi-standard capabilities in the reader.

Therefore, a need exists for a highly integrated, low-cost RFID reader. In addition, a need exists for a dynamic RF front-end that may be used in an RFID reader.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
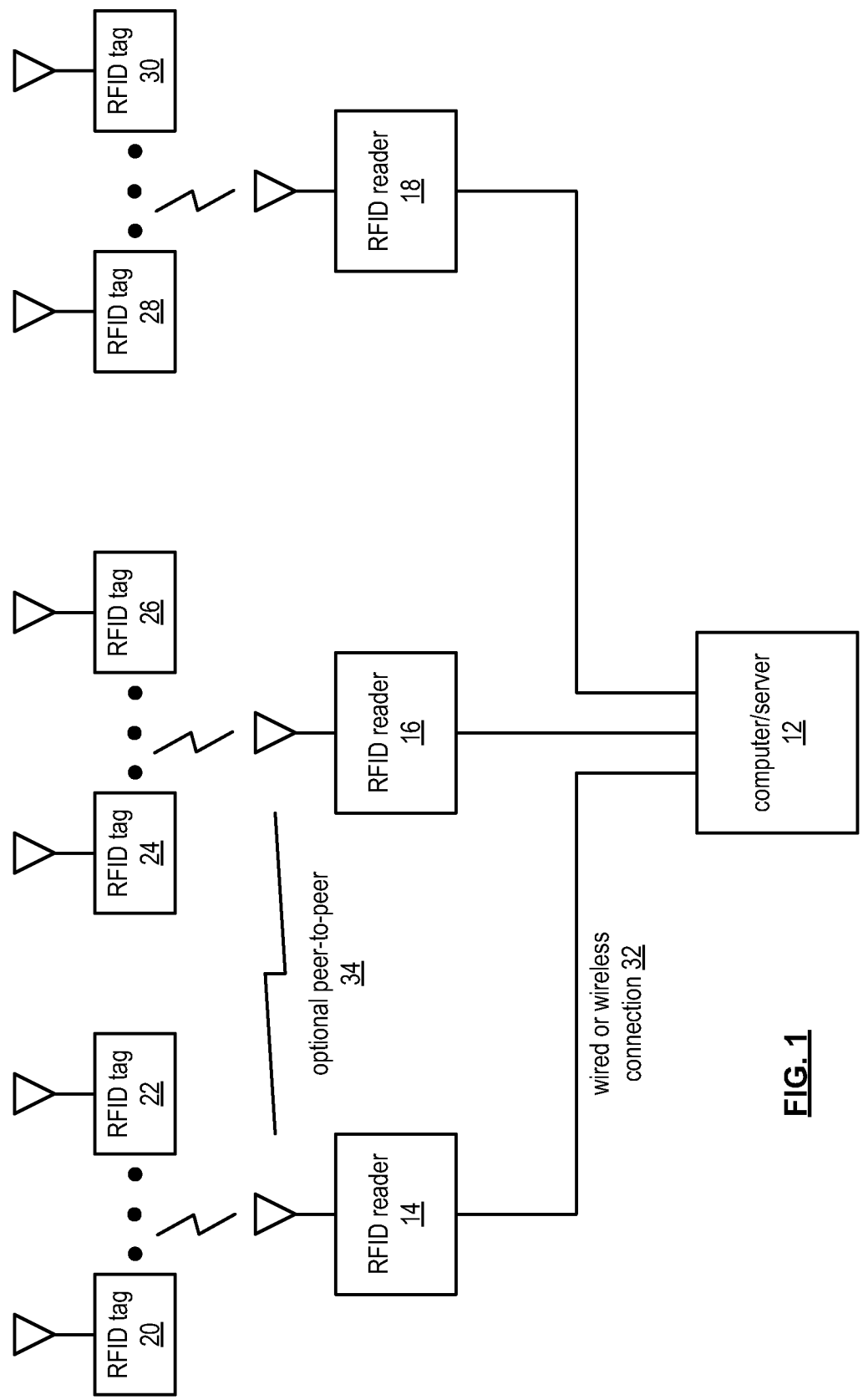
FIG. 1 is a schematic block diagram of an embodiment of an RFID system in accordance with the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, tracking inventory, tracking status, location determination, assembly progress, et cetera. The RFID tags may be active devices that include internal power sources or passive devices that derive power from the RFID readers 14-18.

Each RFID reader 14-18 wirelessly communicates with one or more RFID tags 20-30 within its coverage area. For example, RFID tags 20 and 22 may be within the coverage area of RFID reader 14, RFID tags 24 and 26 may be within the coverage area of RFID reader 16, and RFID tags 28 and 30 may be within the coverage area of RFID reader 18. In one embodiment, the RF communication scheme between the RFID readers 14-18 and RFID tags 20-30 is a backscatter technique whereby the RFID readers 14-18 request data from the RFID tags 20-30 via an RF signal, and the RF tags 20-30 respond with the requested data by modulating and backscattering the RF signal provided by the RFID readers 14-18. In another embodiment, the RF communication scheme between the RFID readers 14-18 and RFID tags 20-30 is an inductance technique whereby the RFID readers 14-18 magnetically couple to the RFID tags 20-30 via an RF signal to access the data on the RFID tags 20-30. In either embodiment, the RFID tags 20-30 provide the requested data to the RFID readers 14-18 on the same RF carrier frequency as the RF signal.

In this manner, the RFID readers 14-18 collect data as may be requested from the computer/server 12 from each of the RFID tags 20-30 within its coverage area. The collected data is then conveyed to computer/server 12 via the wired or wireless connection 32 and/or via peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag can store the data in a non-volatile memory therein.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 to computer/server 12. In embodiments in which communications between RFID reader 16 and computer/server 12 are conveyed through the wired or wireless connection 32, the wired or wireless connection 32 may utilize any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 1 may be expanded to include a multitude of RFID readers 14-18 distributed throughout a desired location (for example, a building, office site, et cetera) where the RFID tags may be associated with equipment, inventory, personnel, et cetera. In addition, it should be noted that the computer/server 12 may be coupled to another server and/or network connection to provide wide area network coverage.

Figure 2:
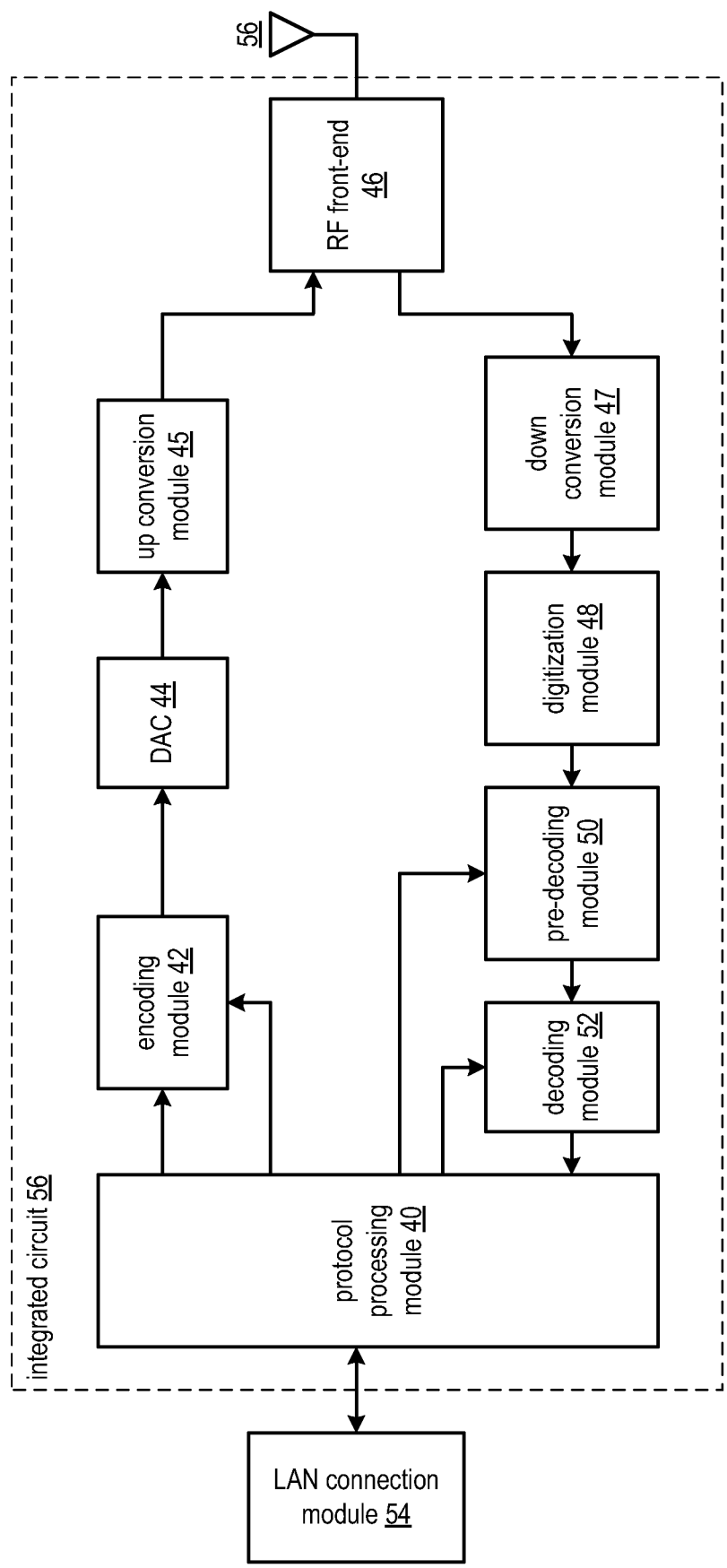
FIG. 2 is a schematic block diagram of an embodiment of an RFID reader in accordance with the present invention.

FIG. 2 is a schematic block diagram of an RFID reader 14-18 that includes an integrated circuit 56 and may further include a host interface module 54. By integrating the RFID reader 14-18 onto a single integrated circuit 56, the cost of the RFID reader 14-18 is significantly reduced. As shown in FIG. 2, the integrated circuit 56 includes a protocol processing module 40, an encoding module 42, a digital-to-analog converter (DAC) 44, an up conversion module 45, an RF front-end 46, a down conversion module 47, a digitization module 48, a predecoding module 50 and a decoding module 52. The host interface module 54 may include a communication interface to a host device, such as a USB dongle, compact flash or PCMCIA.

The protocol processing module 40 is operably coupled to prepare data for encoding in accordance with a particular RFID standardized protocol. In an embodiment, the protocol processing module 40 is programmed with multiple RFID standardized protocols to enable the RFID reader 14-18 to communicate with RFID tags, regardless of the particular protocol associated with the tag. In this embodiment, the protocol processing module 40 operates to program filters and other components of the encoding module 42, decoding module 52, and pre-decoding module 50 in accordance with the particular RFID standardized protocol of the tag(s) currently communicating with the RFID reader 14-18.

In operation, once the particular RFID standardized protocol has been selected for communication with one or more RFID tags, the protocol processing module 40 generates and provides digital data to be communicated to the RFID tag to the encoding module 42 for encoding in accordance with the selected RFID standardized protocol. By way of example, but not limitation, the RFID protocols may include one or more line encoding schemes, such as Manchester encoding, FM0 encoding, FM1 encoding, etc. Thereafter, the encoded data is provided to the digital-to-analog converter 44 which converts the digitally encoded data into an analog signal. The up conversion module 45 combines the digital baseband analog signal with a local oscillation to produce an outbound RF signal. For example, the up conversion module 45 may modulate the analog signal with based on the local oscillation to produce the outbound RF signal having a particular carrier frequency (e.g., 900 MHz, 2.4 GHz, 5 GHz, 56-63 GHz, etc.).

The RF front-end receives the outbound RF signal and converts it into a plurality of outbound RF signals, each having a different phase offset (e.g., 0°, 90°, 180°, 270°). The plurality of outbound RF signals are provided to the antenna array 56, which includes a plurality of orthogonal antennas. By providing selected ones of the plurality of outbound RF signals to selected ones of the antenna array, a desired polarization, and/or phase, is created. Examples of this are provides in FIGS. 5-10, 12 and 13. The RF front-end 46 is also coupled to receive a plurality of inbound RF signals via the antenna array. The RF front-end 46 combines the plurality of inbound RF signals, each of which has a different phase offset, in a particular manner to produce an inbound RF signal. The combination of the inbound RF signals yields a different polarization, and/or phase, than that of the inbound RF signals.

The RF front-end 46 further includes transmit blocking capabilities such that the energy of the outbound RF signal does not substantially interfere with the receiving of the inbound RF signal. The different polarizations and/or phases facilitate the blocking of the energy of the outbound RF signal. The RF front-end 46 provides the inbound RF signal to the down conversion module 47, which produces a baseband signal therefrom. The digitization module 48, which may be a limiting module or an analog-to-digital converter, converts the baseband signal into a digital signal. The predecoding module 50 converts the digital signal into a biphase encoded signal in accordance with the particular RFID protocol being utilized. The biphase encoded data is provided to the decoding module 52, which recaptures data therefrom in accordance with the particular encoding scheme of the selected RFID protocol. The protocol processing module 40 processes the recovered data to identify the object(s) associated with the RFID tag(s) and/or provides the recovered data to the server and/or computer for further processing.

Figure 3:
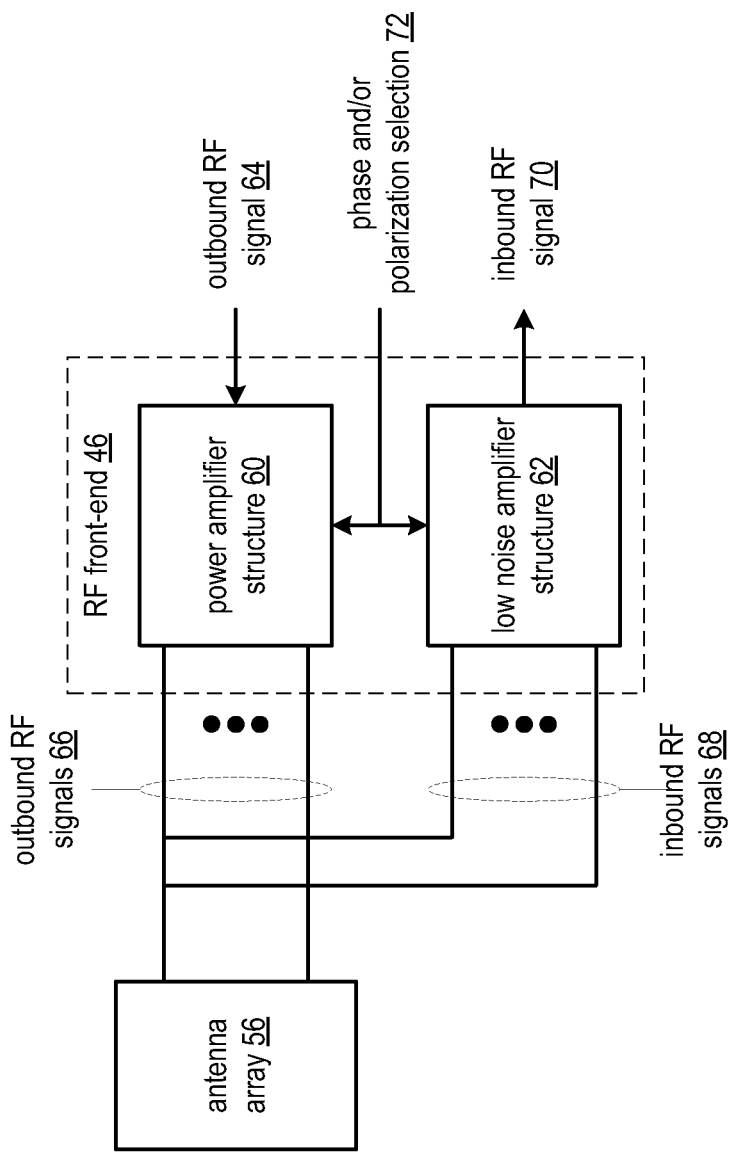
FIG. 3 is a schematic block diagram of an embodiment of a dynamic RF front end in accordance with the present invention.

FIG. 3 is a schematic block diagram of an embodiment of a dynamic RF front end 46 coupled to an antenna array 56. The dynamic RF front end includes a power amplifier structure 60 and a low noise amplifier structure 62. The antenna array 56 may include two orthogonal antennas, four orthogonal antennas, or eight antennas (four orthogonal antennas having a first orientation and four orthogonal antennas having a second orientation, wherein the first and second orientations are offset by approximately forty-five degrees).

In an embodiment, the power amplifier structure 60 generates a plurality of outbound RF signals 66 from an outbound RF signal 64 such that each of the plurality of outbound RF signals has a different transmit phase rotation (e.g., 0° and 90°; 0°, 90°, 180°, and 270°). The power amplifier structure 60 provides the plurality of outbound RF signals 66 to selected antennas of the antenna array to produce a desired phase relationship of the transmission of the outbound RF signals.

In this embodiment, the low noise amplifier structure 62 receives a plurality of inbound RF signals 68 from the antenna array 56. Due to the arrangement of the antenna array 56, each of the plurality of inbound RF signals has a different receive phase rotation (e.g., 0° and 90°; 0°, 90°, 180°, and 270°). The low noise amplifier structure 62 combines the plurality of inbound RF signals in particular manner to produce an inbound RF signal. In this instance, the plurality of inbound RF signals has a favorable phase relationship 72 with respect to the outbound RF signal to reduce interference of the transmission of the outbound RF signals 66 on the reception of the inbound RF signals 68. For example, the closer the phase relationship between the inbound signals and the outbound signals is to 90°, the interference will be lower. As another example, when the phase relationship between the inbound and outbound RF signals provides different polarizations (e.g., an orthogonal relationship, or clockwise-counterclockwise circular polarization), the interference will be lower.

In another embodiment, the power amplifier structure 60 generates a plurality of outbound RF signals 66 from an outbound RF signal 64 in accordance with a desired polarization relationship 72 between the plurality of outbound RF signals and a plurality of inbound RF signals. In this instance, each of the plurality of outbound RF signals 66 has a different transmit phase rotation (e.g., 0° and 90°; 0°, 90°, 180°, and 270°). The power amplifier structure 60 then provides the plurality of outbound RF signals 66 to an antenna array 56 for transmission.

In this embodiment, the low noise amplifier structure 62 receives the plurality of inbound RF signals 68 from the antenna array 56. Due to the arrangement of the antenna array 56, each of the plurality of inbound RF signals has a different receive phase rotation (e.g., 0° and 90°; 0°, 90°, 180°, and 270°). The low noise amplifier structure 62 combines the plurality of inbound RF signals in accordance with the desired polarization relationship 72 (e.g., an orthogonal relationship, or clockwise-counterclockwise circular polarization with respect to the outbound RF signals 66) to produce an inbound RF signal 70.

Figure 4:
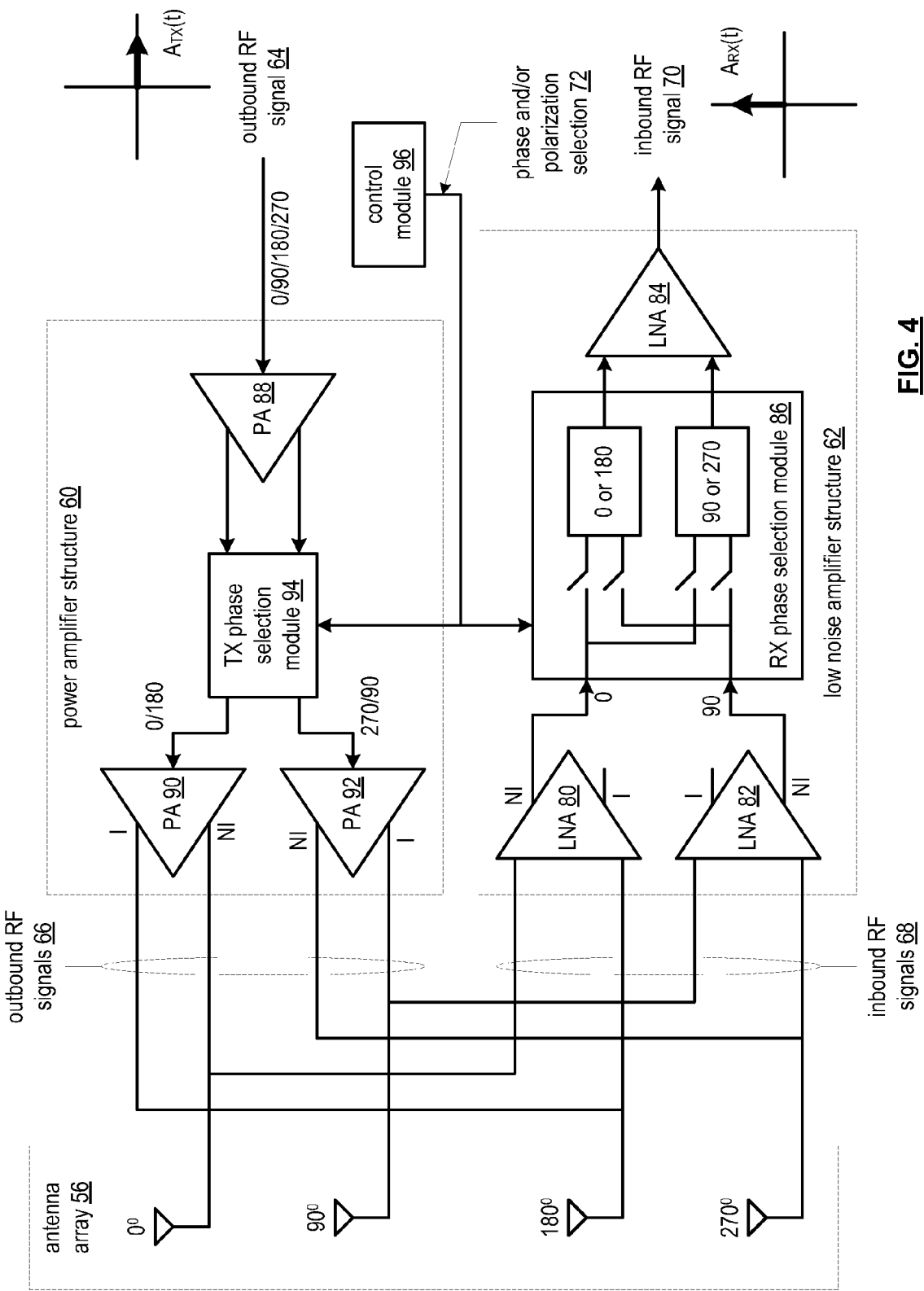
FIG. 4 is a schematic block diagram of another embodiment of a dynamic RF front end in accordance with the present invention.

FIG. 4 is a schematic block diagram of another embodiment of a dynamic RF front end 56 coupled to an antenna array 56 and a control module 96. The antenna array includes four polarized mono pole or dipole antennas: one at 0°, a second at 90°, a third at 180° and a fourth at 270°. The power amplifier structure includes three power amplifier modules (PA) 88-92 and a transmit (TX) phase selection module 94. Each of the PA modules 88-92 includes an inverting (I) and a non-inverting output (NI) and may include one or more power amplifiers coupled in series and/or in parallel and/or one or more power amplifier drivers coupled in series and/or in parallel. The low noise amplifier structure 62 includes three low noise amplifier modules (LNA) 80-84 and a receive (RX) phase selection module 86. Each of the LNA modules 80-84 includes an inverting (I) and a non-inverting output (NI) and may include one or more low noise amplifiers coupled in series and/or in parallel. The RX phase selection module 86 includes a plurality of switches, an inverting or non-inverting module (0 or 180), and a plus/minus ninety degree phase shift module (90 or 270). The TX phase selection module 94 may include a similar construct as the RX selection module 86.

As an example of operation, the first PA 88 receives an outbound RF signal 64, which may be expressed as $A_{TX}(t)\cos(\omega_{RF}+\Phi)$: where $A_{TX}(t)$ represents a constant envelope conditioning signal or an amplitude modulated signal and $\Phi$ may be 0°, 90°, 180°, or 270°. A polar diagram of the outbound signal 64 is shown with $\Phi$ equal to 0°. Note that if $\Phi$ were equal to 90°, the $A_{TX}(t)$ would be aligned with the vertical axis (e.g., an imaginary axis). The first PA 88 amplifies the outbound RF signal to produce first and second outbound RF signals having an orthogonal relationship. For example, the outbound RF signal 64 may include an in-phase component and a quadrature component, which are amplified to produce the first and second outbound RF signals. As another example, the outbound RF signal 64 may be a polar coordinate signal and the first PA 88 includes a ninety degree phase shift module to produce the second outbound RF signal.

The TX, or outbound, phase selection module 94 receives the first and second outbound RF signals and also receives a phase and/or polarization selection signal from the control module 96. In an embodiment, based on signal 72, the TX phase selection module 94 outputs the first outbound RF signal (e.g., $A_{TX}(t)\cos(\omega_{RF}+0)$) or an inversion of the first outbound RF signal (e.g., $A_{TX}(t)\cos(\omega_{RF}+180)$) and outputs the second outbound RF signal (e.g., $A_{TX}(t)\cos(\omega_{RF}+90)$) or an inversion of the second outbound RF signal (e.g., $A_{TX}(t)\cos(\omega_{RF}+270)$) to produce first and second selected outbound RF signals.

The control module 96, which may be a separate processing module or included in processing module 40, generates signal 72 to achieve a desired polarization and/or phase relationship between the outbound RF signal and/or signals 64 and/or 66 and inbound RF signal and/or signals 68 and/or 70. In an embodiment, the outbound RF signals 66 are produced to have a first circular polarization (e.g., clockwise or counterclockwise) and the inbound RF signals are produced to have a second circular polarization (e.g., counterclockwise or clockwise). In addition, or in the alternative, the outbound RF signal 64 is selected to have a first polarization, or phase rotation, (e.g., 0°, 90°, 180°, or 270°) and the inbound RF signal 70 is produced to have a second polarization, or phase rotation, (e.g., 90° offset from the outbound RF signal 64).

In an embodiment, the RFID reader may enter a mode (e.g., a test mode, a calibration mode, a set up mode, a recalibration mode, etc.). In this mode, the control module 96 provides a first setting of signals to the TX and RX phase selection modules 94 and 86. In accordance with the signal, the RX phase selection module 86 outputs a first amplified inbound RF signal and the TX phase selection module 94 outputs the first and second selected outbound RF signals. The control module 96 then determines a phase relationship between an inbound RF signal (e.g., one or more of inbound RF signals 68 and/or inbound signal 70) and the outbound RF signal (e.g., outbound RF signal 64 and/or one or more of outbound RF signals 66). The control module repeats this process for other settings to determine which setting provides a favorable phase and/or polarization relationship (e.g., which settings of the TX and RX phase selection modules provides the best signal to interference ratio between the inbound RF signal 70 and/or signals 68 to outbound RF signal 64 and/or signals 66).

The TX phase selection module 94 provides the first selected outbound RF signal to the second PA 90 and provides the second selected outbound RF signal to the third PA 92. In one embodiment, the second PA 90 amplifies the first selected outbound RF signal to produce a first one of the plurality of outbound RF signals and the third PA coupled to amplify the second selected outbound RF signal to produce a second one of the plurality of outbound RF signals. In this embodiment, the first one of the plurality of outbound RF signals is provided to the 0° or the 180° antenna and the second one of the plurality of outbound RF signals is provided to the 90° or the 270° antenna.

In another embodiment, the second PA 90 amplifies the first selected outbound RF signal to further produce a third one of the plurality of outbound RF signals and the third PA 92 amplifies the second selected outbound RF signal to further produce a fourth one of the plurality of outbound RF signals. In this embodiment, the first one of the plurality of outbound RF signals is provided to the 0°, the third one of the plurality of outbound RF signals is provided to the 180° antenna, the second one of the plurality of outbound RF signals is provided to the 90°, and the fourth one of the plurality of outbound RF signals is provided to the 270° antenna.

In another embodiment, the TX phase selection module 94 may be omitted such that the second PA 90 amplifies the first outbound RF signal (e.g., the 0° phase shifted output of the first PA 88) and the third PA amplifies the second outbound RF signal (e.g., the 90° phase shifted output of the first PA 88). In this embodiment, the second PA 90 produces the first one and the third of the plurality of outbound RF signals and the third PA 92 produces the second one and the fourth one of the plurality of outbound RF signals. Accordingly, the first one of the plurality of outbound RF signals is provided to the 0°, the third one of the plurality of outbound RF signals is provided to the 180° antenna, the second one of the plurality of outbound RF signals is provided to the 90°, and the fourth one of the plurality of outbound RF signals is provided to the 270° antenna.

The antenna array 56 receives inbound RF signals 68, which may be backscattered signals having substantially the same carrier frequency as the outbound RF signals 66 or other type of amplitude modulated (e.g., amplitude modulation, amplitude shift keying, etc.) signals having a carrier frequency substantially the same as that of the outbound RF signals or slightly offset therefrom (e.g., 0.01% to 1.0% difference). The antenna array 56 provides the received inbound RF signals 68 to the low noise amplifier structure 62.

The first LNA 80 amplifies a first inbound RF signal of the inbound RF signals 68 and may also amplify a third inbound RF signal of the inbound RF signals 68 to produce a first amplified inbound RF signal. As an example, the non-inverting output of the LNA 80 provides a 0° phase shifted inbound RF signal. The second LNA amplifies a second inbound RF signal of the inbound RF signals 68 and may further amplify a fourth inbound RF signal of the inbound RF signals 68 to produce a second amplified inbound RF signal. As an example, the non-inverting output of the LNA 82 provides a 90° phase shifted inbound RF signal.

The receive phase selection module 86 outputs the first or the second amplified inbound RF signal based on the signal 72 to produce a selected inbound RF signal. In an embodiment, the switches are closed to couple the output of LNA 80 to the an inverting or non-inverting module (0 or 180) and to couple the output of LNA 82 to the plus/minus ninety degree phase shift module (90 or 270) when the signal 72 is in a first state. Alternatively, the switches may be closed to couple the output of LNA 82 to the an inverting or non-inverting module (0 or 180) and to couple the output of LNA 80 to the plus/minus ninety degree phase shift module (90 or 270) when the signal 72 is in a second state. The signal 72 may further direct the non-inverting module (0 or 180) to output the first amplified inbound RF signal or an inversion of it and may direct the plus/minus ninety degree phase shift module (90 or 270) to output the second amplified inbound RF signal or an inversion of it. In this manner, the resulting inbound RF signal 70 may have a desired phase of 0°, 90°, 180°, and 270° such that it has a desired phase relationship with the outbound RF signal 64 (e.g., offset by 90°). In addition, the inbound RF signals 68 will have a desired phase relationship with respect to the outbound RF signals 66 (e.g., have different polarizations such as a clockwise circular polarization and a counter-clockwise circular polarization.

The third LNA 84 amplifies the selected inbound RF signal to produce the one of the plurality of inbound RF signals (i.e., the inbound RF signal 70). The third LNA 84 provides the inbound RF signal 70 to the down conversion module 47 for conversion to a baseband signal and subsequent processing.

Figure 6:
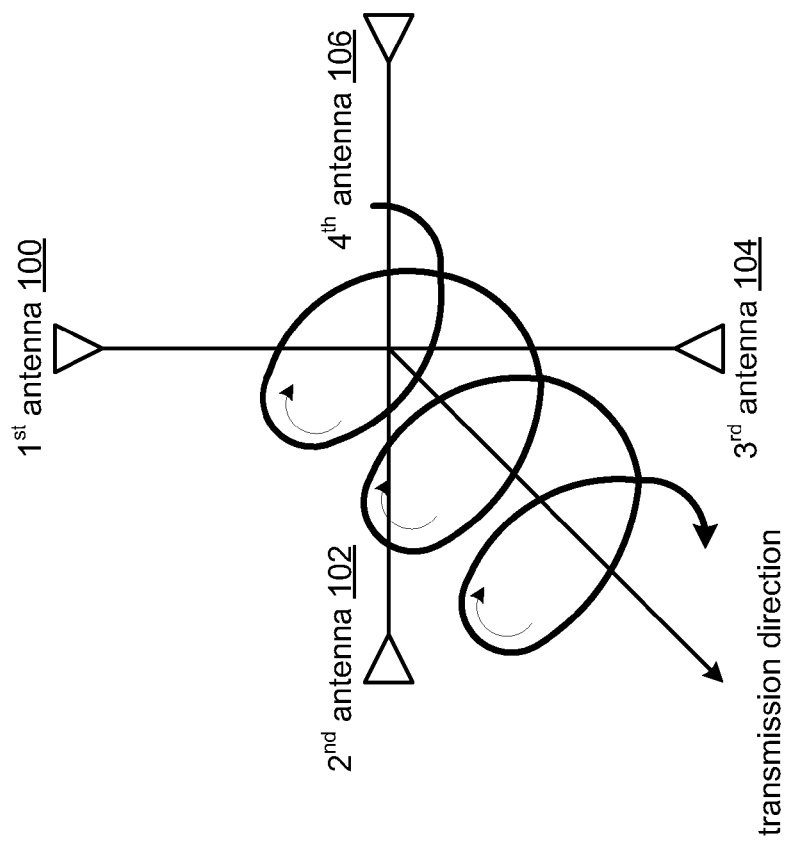
FIGS. 5 and 6 are diagrams illustrating circular polarization in different directions in accordance with the present invention.
Figure 5:
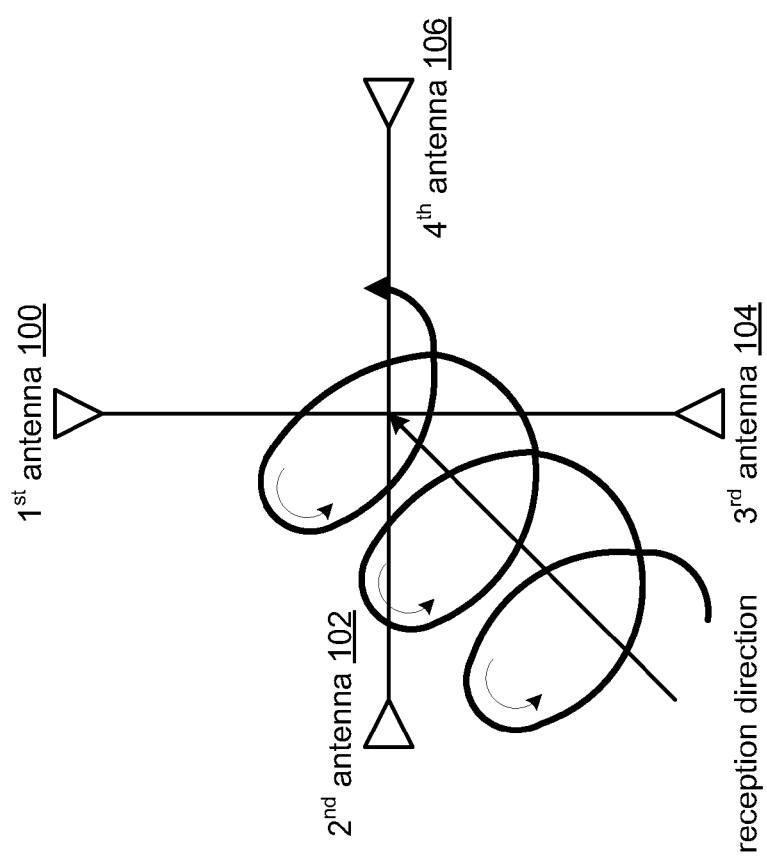

FIGS. 5 and 6 are diagrams illustrating first and second circular polarizations of the first, second, third, and fourth antennas 100-104 of an embodiment of the antenna array 56. In this example, the reception circular polarization is in a counter-clockwise rotation based on the orientation of the antennas and the phase shifting of the inbound RF signals and the transmission circular polarization is in a clockwise rotation based on the orientation of the antennas and the phase shifting of the outbound RF signals. Note that the orientation of the antennas and/or phase shifting of the signals may be switched such that the transmit path has a counter-clockwise circular polarization and the receive path has a clockwise circular polarization. By providing different polarizations, the blocking effect of the outbound RF signals with respect to the inbound RF signals is reduced, thereby improving reception of an inbound RF signal.

Figure 7:
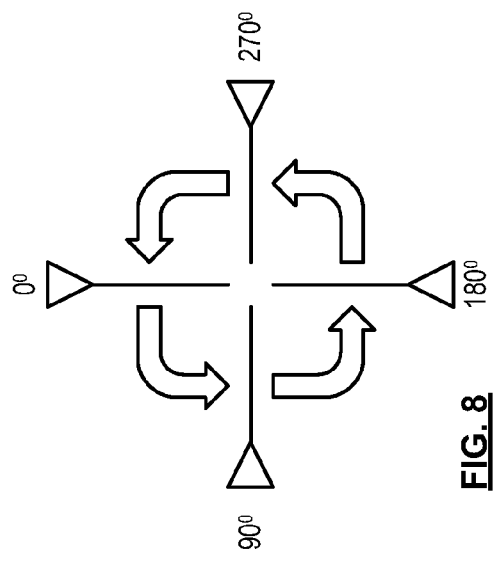
FIGS. 7-10 are diagrams illustrating various antenna phases to obtain different circular polarizations in accordance with the present invention.

FIGS. 7-10 are diagrams illustrating various antenna phases to obtain different circular polarizations. FIG. 7 is an example of a clockwise circular polarization. In this example, the signal (e.g., inbound RF signal or outbound RF signal) having a zero phase shift is coupled to the 0° antenna, the signal having a ninety degree phase shift is coupled to the 90° antenna, the signal having a one-hundred eighty degree phase shift is coupled to the 180° antenna, and the signal having a two-hundred seventy degree phase shift is coupled to the 270° antenna. As previously discussed, the TX and RX phase select modules in response to signals provided by the control module establish the coupling of antennas to signal paths.

Figure 8:
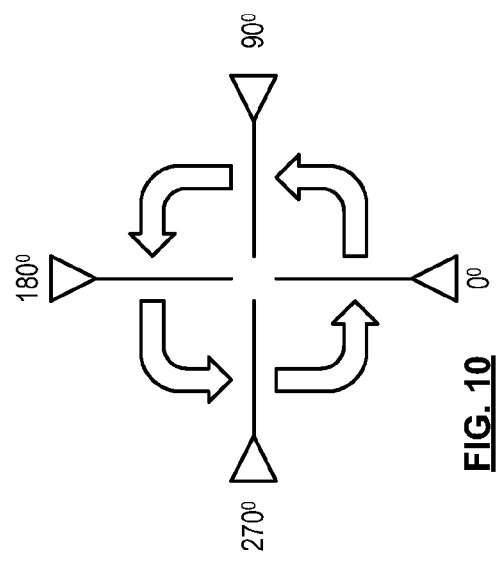

FIG. 8 is an example of a counterclockwise circular polarization. In this example, the signal (e.g., inbound RF signal or outbound RF signal) having a zero phase shift is coupled to the 0° antenna, the signal having a ninety degree phase shift is coupled to the 270° antenna, the signal having a one-hundred eighty degree phase shift is coupled to the 180° antenna, and the signal having a two-hundred seventy degree phase shift is coupled to the 90° antenna. By using the circular polarization of FIG. 7 or 8 for the inbound RF signals or the outbound RF signals and using the other circular polarization for the other RF signals, the outbound RF signals provide less interference to the reception of the inbound RF signals.

Figure 9:
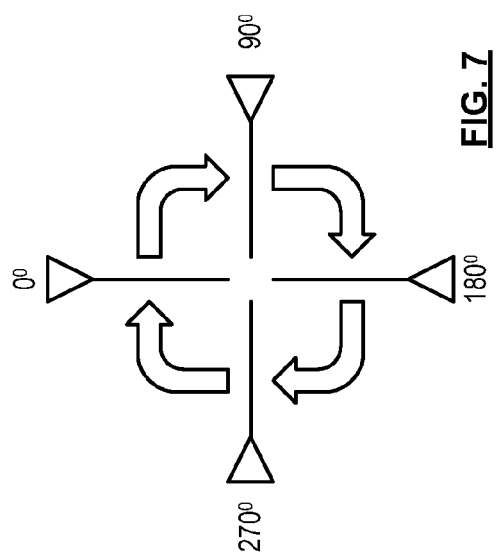

FIG. 9 is an example of a clockwise circular polarization. In this example, the signal (e.g., inbound RF signal or outbound RF signal) having a zero phase shift is coupled to the 180° antenna, the signal having a ninety degree phase shift is coupled to the 270° antenna, the signal having a one-hundred eighty degree phase shift is coupled to the 0° antenna, and the signal having a two-hundred seventy degree phase shift is coupled to the 90° antenna.

Figure 10:
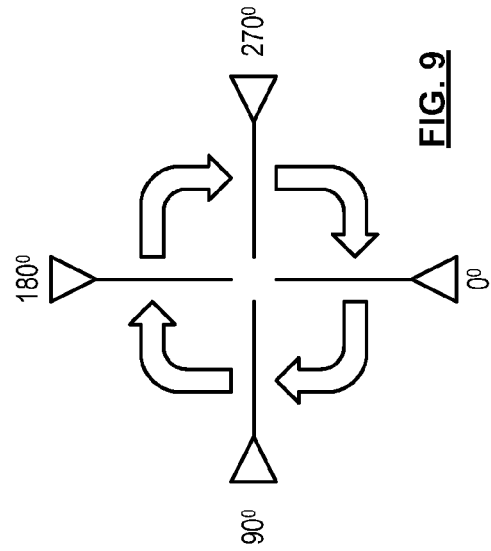

FIG. 10 is an example of a counterclockwise circular polarization. In this example, the signal (e.g., inbound RF signal or outbound RF signal) having a zero phase shift is coupled to the 180° antenna, the signal having a ninety degree phase shift is coupled to the 90° antenna, the signal having a one-hundred eighty degree phase shift is coupled to the 0° antenna, and the signal having a two-hundred seventy degree phase shift is coupled to the 270° antenna.

Figure 11:
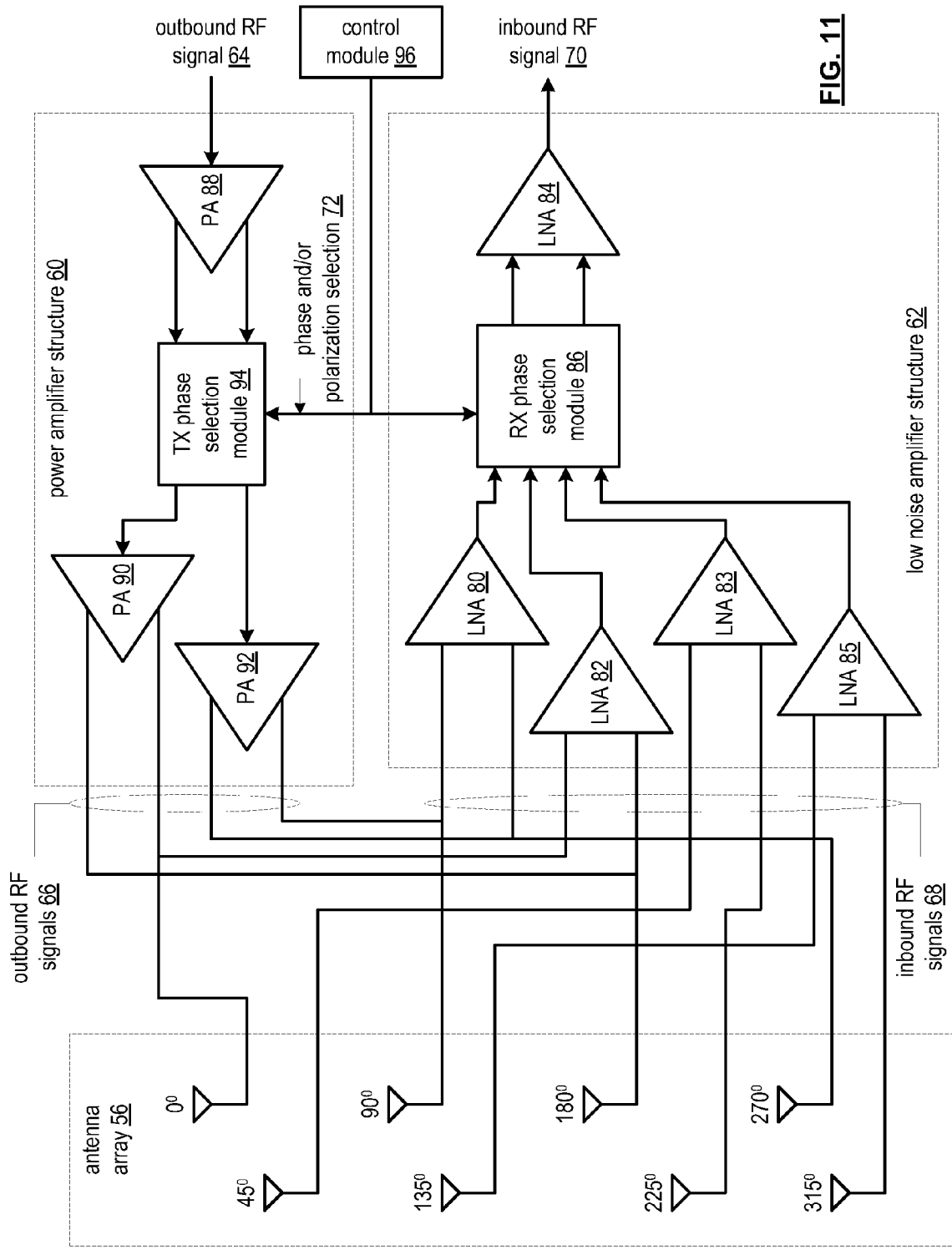
FIG. 11 is a schematic block diagram of another embodiment of a dynamic RF front end in accordance with the present invention.

FIG. 11 is a schematic block diagram of another embodiment of a dynamic RF front end 46 coupled to an antenna array 56 and a control module 96. In this embodiment, the antenna array includes eight antennas: four as in FIG. 4 and four having a phase offset of 45°, 135°, 225°, and 315°. As such, the second set of four antennas is rotated by 45° with respect to the first set of antennas. The low noise amplifier structure 62 includes the three LNAs 80-84 of FIG. 4 and two additional LNAs 83 and 85. The power amplifier structure 60 includes the same components and functions in the same way as described in FIG. 4.

In this embodiment, the low noise amplifier structure 62 may use the inbound RF signals received via the 0°, 90°, 180°, and 270° antennas as previously discussed with reference to FIG. 4. Alternatively, the low noise amplifier structure 62 may process the inbound RF signals received via the 45°, 135°, 225°, and 315° antennas. In this latter approach, LNAs 83 and 85 amplify the plurality of inbound RF signals to produce a third and fourth inbound RF signals. In an embodiment, the third inbound RF signal has a phase offset of 45° and the fourth inbound RF signal has a phase offset of 135°.

The RX phase selection module 86 outputs the third or the fourth amplified inbound RF signal or inversions thereof based on the signal 72 to produce a selected inbound RF signal. In this manner, the resulting inbound RF signal 70 may have a desired phase of 45°, 135°, 225°, or 315° such that it has a desired phase relationship with the outbound RF signal 64 (e.g., offset by 45°). In addition, the inbound RF signals 68 will have a desired phase relationship with respect to the outbound RF signals 66 (e.g., have different polarizations such as a clockwise circular polarization and a counterclockwise circular polarization.

Figure 13:
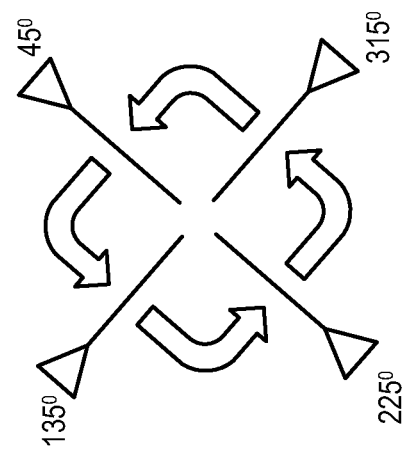
FIGS. 12 and 13 are diagrams illustrating various antenna phases to obtain different circular polarizations in accordance with the present invention.
Figure 12:
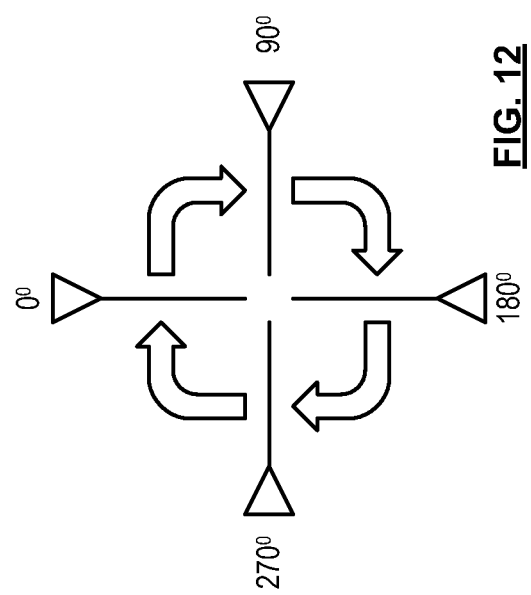

FIGS. 12 and 13 are diagrams illustrating various antenna phases to obtain different circular polarizations for the embodiment of FIG. 11. FIG. 12 is an example of a clockwise circular polarization that may used to transmit the outbound RF signals. In this example, the outbound RF signal having a zero phase shift is coupled to the 0° antenna, the outbound RF signal having a ninety degree phase shift is coupled to the 90° antenna, the outbound RF signal having a one-hundred eighty degree phase shift is coupled to the 180° antenna, and the outbound RF signal having a two-hundred seventy degree phase shift is coupled to the 270° antenna.

FIG. 13 is an example of a counterclockwise circular polarization that may be used to receive the inbound RF signals. In this example, the inbound RF signal having a zero phase shift is coupled to the 45° antenna, the inbound RF signal having a ninety degree phase shift is coupled to the 315° antenna, the signal having a one-hundred eighty degree phase shift is coupled to the 225° antenna, and the signal having a two-hundred seventy degree phase shift is coupled to the 135° antenna.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A dynamic radio frequency (RF) front end comprises:
a power amplifier structure configured to generate a plurality of outbound RF signals from one outbound RF signal, wherein the power amplifier structure includes a transmit phase selection module to receive a first selection signal to set a transmit phase for the plurality of outbound RF signals based on a transmit phase rotation, in which the power amplifier structure is to provide the plurality of outbound RF signals to corresponding antennas of an antenna array, wherein the corresponding antennas of the antenna array have an orthogonal arrangement, for transmission of the plurality of outbound RF signals using a first circular polarization which is one of clockwise or counter-clockwise polarization; and a low noise amplifier structure configured to receive a plurality of inbound RF signals from the corresponding antennas of the antenna array using a second circular polarization that is opposite in clockwise or counter-clockwise polarization from the first circular polarization, in which the plurality of inbound RF signals have different receive phase relationship based on the orthogonal arrangement of the corresponding antennas, wherein the low noise amplifier structure includes a receive phase selection module to receive a second selection signal to select and output a selected one of the plurality of inbound RF signals as a selected inbound RF signal that provides a favorable phase relationship with respect to the one outbound RF signal, the first and second selection signals to be generated by a control module that determines the favorable phase relationship, wherein the opposite polarization and the favorable phase relationship reduces interference between the selected inbound RF signal and the one outbound RF signal.

2. The dynamic RF front end of claim 1, wherein the low noise amplifier structure comprises:
a first low noise amplifier (LNA) coupled to a first antenna of the corresponding antennas of the antenna array to amplify a first inbound RF signal of the plurality of inbound RF signals to produce a first amplified inbound RF signal, wherein the first amplified inbound RF signal has a first phase value;
a second LNA coupled to a second antenna of the corresponding antennas of the antenna array to amplify a second inbound RF signal of the plurality of inbound RF signals to produce a second amplified inbound RF signal, wherein the second amplified inbound RF signal has a second phase value;
wherein the receive phase selection module is operable to output the first or the second amplified inbound RF signal as the selected inbound RF signal to obtain the favorable phase relationship with respect to the one outbound RF signal; and
a third LNA coupled to amplify the selected inbound RF signal.

3. The dynamic RF front end of claim 2, wherein:
the first LNA is further coupled to a third antenna of the corresponding antennas of the antenna array to amplify a third inbound RF signal of the plurality of inbound RF signals to produce a third amplified inbound RF signal, wherein the third amplified inbound RF signal has a third phase value;
the second LNA is further coupled to a fourth antenna of the corresponding antennas of the antenna array to amplify a fourth inbound RF signal of the plurality of inbound RF signals to produce a fourth amplified inbound RF signal, wherein the fourth amplified inbound RF signal has a fourth phase value; and
the receive phase selection module is operable to output one of the first, the second, the third or the fourth amplified inbound RF signal as the selected inbound RF signal to obtain the favorable phase relationship with respect to the one outbound RF signal.

4. The dynamic RF front end of claim 3, wherein the low noise amplifier structure further comprises:
a third LNA coupled to a fifth antenna and a seventh antenna of the antenna array to amplify fifth and seventh inbound RF signals of the plurality of inbound RF signals to produce fifth and seventh amplified inbound RF signals, wherein the fifth amplified inbound RF signal has a fifth phase value and the seventh amplified inbound RF signal has a seventh phase value;
a fourth LNA coupled to a sixth antenna and an eighth antenna of the antenna array to amplify sixth and eighth inbound RF signals of the plurality of inbound RF signals to produce sixth and eighth amplified inbound RF signals, wherein the sixth amplified inbound RF signal has a sixth phase value and the eighth amplified inbound RF signal has an eighth phase value; and
wherein the receive phase selection module is operable to output one of the first, the second, the third, the fourth, the fifth, the sixth, the seventh, or the eighth amplified inbound RF signal as the selected inbound RF signal to obtain the favorable phase relationship with respect to the one outbound RF signal and the fifth, the sixth, the seventh and the eighth antennas also have an orthogonal arrangement and are respectively phased 45° from the first, the second, the third and the fourth antennas.

5. The dynamic RF front end of claim 2, wherein the control module is to:
cause the receive phase selection module to output a non-inverted output of the first amplified inbound RF signal in response to a first control signal;
determine a phase relationship between the non-inverted output of the first amplified inbound RF signal and the one outbound RF signal;
cause the receive phase selection module to output an inverted output of the first amplified inbound RF signal in response to a second control signal;
determine a phase relationship between the inverted output of the first amplified inbound RF signal and the one outbound RF signal;
cause the receive phase selection module to output a non-inverted output of the second amplified inbound RF signal in response to a third control signal;
determine a phase relationship between the non-inverted output of the second amplified inbound RF signal and the one outbound RF signal;
cause the receive phase selection module to output an inverted output of the second amplified inbound RF signal in response to a fourth control signal;
determine a phase relationship between the inverted output of the second amplified inbound RF signal and the one outbound RF signal;
compare the phase relationship between the non-inverted and inverted outputs of second amplified inbound RF signal and the one outbound RF signal and the phase relationship between the non-inverted and inverted outputs of the first amplified inbound RF signal and the one outbound RF signal; and
utilize a respective one of the first, the second, the third or the fourth control signal to output a respective amplified inbound RF signal that provides the favorable phase relationship with respect to the one outbound RF signal.

6. The dynamic RF front end of claim 1, wherein the power amplifier structure comprises:
a first power amplifier (PA) module coupled to amplify the one outbound RF signal to produce first and second outbound RF signals having an orthogonal relationship to couple to the transmit phase selection module;

a second PA module coupled to the transmit phase selection module to amplify the first outbound RF signal to produce a third outbound RF signal, when the transmit phase selection module selects the first outbound RF signal; and a third PA coupled to the transmit phase selection module to amplify the second outbound RF signal to produce a fourth outbound RF signal, when the transmit phase selection module selects the second outbound RF signal.

7. The dynamic RF front end of claim 1, wherein the power amplifier structure comprises:

a first power amplifier (PA) module coupled to amplify the one outbound RF signal to produce first and second outbound RF signals having an orthogonal relationship to couple to the transmit phase selection module;

a second PA module coupled to the transmit phase selection module to amplify the first outbound RF signal to produce a third and fifth outbound RF signals, when the transmit phase selection module selects the first outbound RF signal; and a third PA module coupled to the transmit phase selection module to amplify the second outbound RF signal to produce a fourth and sixth outbound RF signals, when the transmit phase selection module selects the second outbound RF signal.

8. The dynamic RF front end of claim 1, wherein the power amplifier structure comprises:

a first power amplifier (PA) module coupled to amplify the one outbound RF signal to produce first and second outbound RF signals having an orthogonal relationship to couple to the transmit phase selection module;

the transmit phase selection module operable to output a non-inverted output of the first outbound RF signal or an inverted output of the first outbound RF signal and to output a non-inverted output of the second outbound RF signal or an inverted output of the second outbound RF signal;

a second PA module coupled to the transmit phase selection module to amplify the non-inverted output of the first outbound RF signal or the inverted output of the first outbound RF signal to produce a third outbound RF signal; and a third PA module coupled to the transmit phase selection module to amplify the non-inverted output of the second outbound RF signal or the inverted output of the second outbound RF signal to produce a fourth outbound RF signal.

9. The dynamic RF front end of claim 8 further comprises:

the second PA module further coupled to amplify other of the non-inverted output or the inverted output of the first outbound RF signal to produce a fifth outbound RF signal; and the third PA module further coupled to amplify other of the non-inverted output or the inverted output of the second outbound RF signal to produce a sixth outbound RF signal.

10. An apparatus comprises:

a power amplifier structure of a radio frequency (RF) front end configured to generate a plurality of outbound RF signals from one outbound RF signal, wherein the power amplifier structure includes a transmit phase selection module to receive a first selection signal to set a transmit phase for the plurality of outbound RF signals based on a transmit phase rotation, in which the power amplifier structure to provide the plurality of outbound RF signals to corresponding antennas of an antenna array, wherein the corresponding antennas of the antenna array have an orthogonal arrangements set at 0°, 90°, 180° and 270°, for transmission of the plurality of outbound signals using a first circular polarization which is one of clockwise or counter-clockwise polarization;

a low noise amplifier structure of the RF front end configured to receive a plurality of inbound RF signals from the corresponding antennas of the antenna array using a second circular polarization that is opposite in clockwise or counter-clockwise polarization from the first circular polarization, in which four of the plurality of inbound RF signals have respective receive phase relationship of 0°, 90°, 180° and 270° based on the orthogonal arrangement of the corresponding antennas, wherein the low noise amplifier structure includes a receive phase selection module to receive a second selection signal to select and output a selected one of the plurality of inbound RF signals; and a control module configured with the power amplifier structure and the low noise amplifier structure, in which the control module is to generate the first and second selection signals to select and output a selected one of the plurality of inbound RF signals that has a favorable phase relationship and with respect to the one outbound RF signal to reduce interference between the selected inbound RF signal and the one outbound RF signals in combination with the opposite polarization.

11. The apparatus of claim 10, wherein the low noise amplifier structure comprises:

a first low noise amplifier (LNA) coupled to a first antenna of the corresponding antennas of the antenna array to amplify a first inbound RF signal of the plurality of inbound RF signals to produce a first amplified inbound RF signal, wherein the first amplified inbound RF signal has a phase value of 0°;

a second LNA coupled to a second antenna of the corresponding antennas of the antenna array to amplify a second inbound RF signal of the plurality of inbound RF signals to produce a second amplified inbound RF signal, wherein the second amplified inbound RF signal has a phase value of 90°;

wherein the receive phase selection module is operable to output the first or the second amplified inbound RF signal as the selected inbound RF signal to obtain the favorable phase relationship with respect to the one outbound RF signal; and a third LNA coupled to amplify the selected inbound RF signal.

12. The apparatus of claim 11, wherein:

the first LNA is further coupled to a third antenna of the corresponding antennas of the antenna array to amplify a third inbound RF signal of the plurality of inbound RF signals to produce a third amplified inbound RF signal, wherein the third amplified inbound RF signal has a phase value of 180°;

the second LNA is further coupled to a fourth antenna of the corresponding antennas of the antenna array to amplify a fourth inbound RF signal of the plurality of inbound RF signals to produce a fourth amplified inbound RF signal, wherein the fourth amplified inbound RF signal has a phase value of 270°; and the receive phase selection module is operable to output one of the first, the second, the third or the fourth amplified inbound RF signal as the selected inbound RF signal to obtain the favorable phase relationship with respect to the outbound RF signal.

13. The apparatus of claim 12, wherein the low noise amplifier structure further comprises:
- a third LNA coupled to a fifth antenna and a seventh antenna of the antenna array to amplify fifth and seventh inbound RF signals of the plurality of inbound RF signals to produce fifth and seventh amplified inbound RF signals, wherein the fifth amplified inbound RF signal has a phase value of 45° and the seventh amplified inbound RF signal has a phase value of 225°;
- a fourth LNA coupled to a sixth antenna and an eighth antenna of the antenna array to amplify sixth and eighth inbound RF signals of the plurality of inbound RF signals to produce sixth and eighth amplified inbound RF signals, wherein the sixth amplified inbound RF signal has a phase value of 135° and the eighth amplified inbound RF signal has a phase value of 315°; and
- the receive phase selection module is operable to output one of the first, the second, the third, the fourth, the fifth, the sixth, the seventh, or the eighth amplified inbound RF signal as the selected inbound RF signal to obtain the favorable phase relationship with respect to the one outbound RF signal.

14. The apparatus of claim 10, wherein the power amplifier structure comprises:
- a first power amplifier (PA) module coupled to amplify the one outbound RF signal to produce first and second outbound RF signals having an orthogonal relationship to couple to the transmit phase selection module;
- a second PA module coupled to the transmit phase selection module to amplify the first outbound RF signal to produce a third outbound RF signal, when the transmit phase selection module selects the first outbound RF signal; and
- a third PA coupled to the transmit phase selection module to amplify the second outbound RF signal to produce a fourth outbound RF signal, when the transmit phase selection module selects the second outbound RF signal.

15. The apparatus of claim 10, wherein the power amplifier structure comprises:
- a first power amplifier (PA) module coupled to amplify the one outbound RF signal to produce first and second outbound RF signals having an orthogonal relationship to couple to the transmit phase selection module;
- a second PA module coupled to the transmit phase selection module to amplify the first outbound RF signal to produce a third and fifth outbound RF signals, when the transmit phase selection module selects the first outbound RF signal; and
- a third PA module coupled to the transmit phase selection module to amplify the second outbound RF signal to produce a fourth and sixth outbound RF signals, when the transmit phase selection module selects the second outbound RF signal.

16. The apparatus of claim 10, wherein the power amplifier structure comprises:
- a first power amplifier (PA) module coupled to amplify the one outbound RF signal to produce first and second outbound RF signals having an orthogonal relationship to couple to the transmit phase selection module;
- the transmit phase selection module operable to output a non-inverted output of the first outbound RF signal or an inverted output of the first outbound RF signal and to output a non-inverted output of the second outbound RF signal or an inverted output of the second outbound RF signal;
- a second PA module coupled to the transmit phase selection module to amplify the non-inverted output of the first outbound RF signal or the inverted output of the first outbound RF signal to produce a third outbound RF signal; and
- a third PA module coupled to the transmit phase selection module to amplify the non-inverted output of the second outbound RF signal or the inverted output of the second outbound RF signal to produce a fourth outbound RF signal.

17. The apparatus of claim 16 further comprises:
- the second PA module further coupled to amplify other of the non-inverted output or the inverted output of the first outbound RF signal to produce a fifth outbound RF signal; and
- the third PA module further coupled to amplify other of the non-inverted output or the inverted output of the second outbound RF signal to produce a sixth outbound RF signal.

18. The apparatus of claim 10, wherein the phase offset between the selected inbound RF signal and the one outbound RF signal is approximately 45° or 90°.

19. The apparatus of claim 10, wherein the apparatus is a radio frequency identification device.

20. The apparatus of claim 10, wherein the apparatus is a radio frequency identification reader.

* * * * *